United States Patent
Gross et al.

(10) Patent No.: US 11,631,904 B2
(45) Date of Patent: Apr. 18, 2023

(54) BATTERY SYSTEM

(71) Applicant: Robert Bosch GmbH, Stuttgart (DE)

(72) Inventors: Andre Gross, Kraichtal (DE); Felix Koehl, Backnang (DE); Henrik Wolfgang Behm, Reutlingen (DE); Holger Stegmueller, Boeblingen (DE); Markus Schmitt, Tamm (DE); Matthias Oechsle, Ditzingen-Hirschlanden (DE); Peter Kohn, Stuttgart (DE); Philipp Einsiedel, Wallhausen (DE); Robert Kohler, Stuttgart (DE); Stefan Baumann, Altenriet (DE); Steve Kroeger, Stuttgart (DE); Thomas Dittert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 17/092,874

(22) Filed: Nov. 9, 2020

(65) Prior Publication Data
US 2021/0143487 A1 May 13, 2021

(30) Foreign Application Priority Data

Nov. 8, 2019 (DE) .......................... 102019217296.2

(51) Int. Cl.
*H01M 10/48* (2006.01)
*H01M 10/42* (2006.01)
*H01M 10/44* (2006.01)

(52) U.S. Cl.
CPC ....... *H01M 10/425* (2013.01); *H01M 10/441* (2013.01); *H01M 10/482* (2013.01); *H01M 10/486* (2013.01); *H01M 2220/20* (2013.01)

(58) Field of Classification Search
CPC ............ H01M 10/425; H01M 10/441; H01M 10/482; H01M 10/486; H01M 2220/20
See application file for complete search history.

(56) References Cited

U.S. PATENT DOCUMENTS 2,145,866 A * 2/1939 Failla ...................... G01T 1/185
310/78
5,517,470 A * 5/1996 Zanders ................ H03M 1/007
365/185.23
(Continued)

FOREIGN PATENT DOCUMENTS

JP 4832225 * 7/2011
JP 2011138685 A 7/2011
(Continued)

OTHER PUBLICATIONS

MTWO 2012090523 (Year: 2012).*
(Continued)

*Primary Examiner* — Alexander Usyatinsky
(74) *Attorney, Agent, or Firm* — Michael Best & Friedrich LLP

(57) ABSTRACT

A battery system (100) which comprises a metallic battery housing (200) and a metallic component housing (300), wherein at least one battery module (10) having at least one battery cell (12) and a control unit (20) for controlling and monitoring the at least one battery module (10) are arranged in the battery housing (200) and wherein at least one electrical component (80) is arranged in the component housing (300), which electrical component is electrically connected to the at least one battery module (10).

14 Claims, 1 Drawing Sheet

(56) References Cited

U.S. PATENT DOCUMENTS

| | | | | |
|---|---|---|---|---|
| 6,060,186 | A | * | 5/2000 | Broussely ........... H01M 50/571 |
| | | | | 429/231.95 |
| 2006/0169526 | A1 | | 8/2006 | Honbo et al. |
| 2011/0261551 | A1 | * | 10/2011 | Chirila .................. H01Q 1/243 |
| | | | | 361/818 |
| 2012/0188201 | A1 | * | 7/2012 | Binstead ............... G06F 3/0443 |
| | | | | 345/173 |
| 2014/0376199 | A1 | * | 12/2014 | Kato .................... H05K 1/0298 |
| | | | | 361/753 |
| 2015/0037647 | A1 | | 2/2015 | Nguyen et al. |
| 2017/0126036 | A1 | * | 5/2017 | Dulle .................... H01M 10/42 |

FOREIGN PATENT DOCUMENTS

| | | | |
|---|---|---|---|
| JP | 4832225 | B2 | 12/2011 |
| WO | WO 2012090523 | * | 5/2012 |
| WO | 2012090523 | A1 | 7/2012 |
| WO | 2015016979 | A1 | 2/2015 |

OTHER PUBLICATIONS

JP 4832225MT (Year: 2011).*
TracoPower, "TracoPower TEP 100-1215 DC/DC-Wandler-Baustein 12 V/DC 24 V/DC 4.2A 100W Anzahl Ausgange: 1x", <https://www.voelkner.de/products/654312/TracoPower-TEP-100-1215-DC-DC-Wandler-Baustine-12-V-DC-24-V-DC-4.2A-100W-Anzahl-Ausgaenge-1-x.html>, webpage accessed Sep. 17, 2020 (4 pages).

* cited by examiner

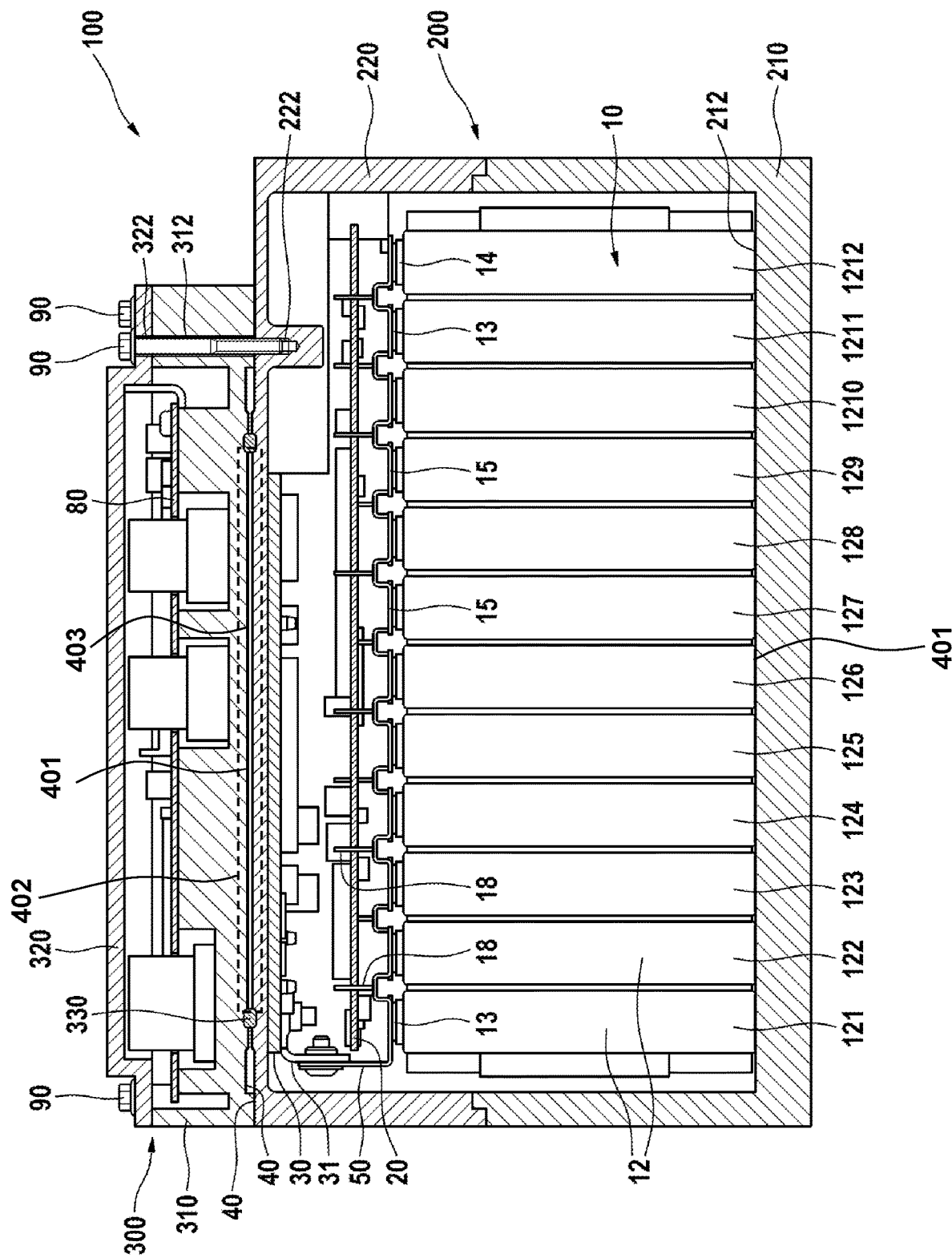

BATTERY SYSTEM

BACKGROUND OF THE INVENTION

The invention relates to a battery system which comprises a metallic battery housing and a metallic component housing, wherein at least one battery module having at least one battery cell and a control unit for controlling and monitoring the at least one battery module are arranged in the battery housing and wherein at least one electrical component is arranged in the component housing, which electrical component is electrically connected to the at least one battery module.

The invention further relates to a motor vehicle that comprises at least one battery system according to the invention.

It is becoming apparent that electrically powered motor vehicles will be increasingly used in the future. Electrically powered motor vehicles of this type, such as hybrid vehicles and electric vehicles, for example, comprise in each case a battery system for supplying energy. In this case, the battery system comprises a battery housing for receiving at least one battery module and a control unit for controlling and monitoring the at least one battery module. Furthermore, the battery system can also have further electrical components which are arranged in a component housing or in a plurality of separate component housings.

The battery housing and the component housing or component housings are typically made from metal, in order to realize shielding from electromagnetic interference, high mechanical stability and/or good heat dissipation.

In order to shield the electromagnetic interference, the battery housing and the component housing or component housings as well as the electrical components arranged in both of the housings are connected to a common ground potential.

In the case of a vehicle, the common ground potential is the body or the frame. As a conductive part which extends over the entire vehicle, it simultaneously serves as a return conductor for the vehicle electrical system. This means that only one line has to be installed for supplying energy to each consumer.

Document US 2006/0169526 A1 discloses a lead storage battery which is used in a power assisted steering system for supplying current.

A battery module which is arranged in a housing is known from document US 2015/0037647 A1. A battery control unit and a DC-DC converter are also arranged in the housing.

SUMMARY OF THE INVENTION

A battery system is proposed. In this case, the battery system comprises a metallic battery housing and a metallic component housing. In this case, at least one battery module having at least one battery cell and a control unit for controlling and monitoring the at least one battery module are arranged in the battery housing. At least one electrical component is arranged in the component housing, which electrical component is electrically connected to the at least one battery module.

The battery housing and the component housing are in each case preferably made from cast aluminum. In this case, the battery housing and the component housing each have a feedthrough for current and signal transmission.

The at least one battery module is preferably arranged on a base of the battery housing and has a positive terminal and a negative terminal, between which the at least one battery cell is connected. In this case, the at least one battery cell can be designed to be circular cylindrical or prismatic.

According to the invention, the component housing is arranged on the battery housing. In this case, the battery housing and the component housing are mechanically connected to one another and electrically insulated from one another. The battery housing is connected to a first ground potential, while the component housing is connected to a second ground potential. In this case, the first ground potential is different from the second ground potential. It is conceivable for the first ground potential to be a floating potential.

The battery housing and the component housing are electrically insulated from one another if an insulator is arranged at least at the respective connection points between the battery housing and the component housing.

The battery housing and the component housing can advantageously be connected to one another in a cohesive manner, such as by means of bonding, for example.

However, the battery housing and the component housing can also advantageously be connected to one another in a form-fitting manner, such as by way of screwing, for example. The battery housing and the component housing each have fixing holes for this purpose, for example. In this case, the fixing holes of the component housing can each be designed as a through hole. Electrically non-conductive screws, such as plastic screws, for example, can be used in this case. However, it is also conceivable to use electrically conductive screws. In this case, the respective fixing holes and bearing surfaces of the screw heads can each be coated with an insulator. It is also conceivable for shafts of the respective electrically conductive screws and bearing surfaces of the screw heads to be coated with an insulator. In addition to coating with an insulator, a countersink can be provided in each case at both ends of the respective fixing holes of the component housing. Moreover, a sliding and tough layer, such as a polyimide layer, for example, can be applied to the bearing surfaces of the respective screw heads, in order to avoid rubbing of the coating.

In this case, the battery housing and the component housing are designed in such a way that combined they possess the necessary resistance to different mechanical loads.

The battery housing is preferably coated with an insulator. The insulator can be cathodic dip coating, for example. It is also conceivable to use hard adonizing or insulating adhesive tape. In this case, the insulator can be coated exclusively on a surface of the battery housing which faces the component housing. It is also conceivable for the battery housing to be completely coated with the insulator.

The component housing is preferably also coated with the insulator. In this case, the insulator can be coated exclusively on a surface of the component housing with faces the battery housing. It is also conceivable for the component housing to be completely coated with the insulator.

The insulator for coating the battery housing and/or the component housing and the insulator for coating the respective fixing holes and the bearing surfaces of the screw heads or the shafts of the respective electrically conductive screws can be the same or different.

A first temperature control device is preferably formed between the battery housing and the component housing. The first temperature control device is preferably insulated from the battery housing and the component housing. The first temperature control device can be designed in such a way that a seal is placed between the battery housing upper part and the component housing lower part, wherein a first temperature control channel is designed in a region enclosed by the seal between the battery housing upper part and the component housing lower part. It is also conceivable for the first temperature control device to be designed as a Peltier element unit.

The battery system according to the invention preferably comprises a disconnect switch unit for disconnecting a discharging current or a charging current of the at least one battery module. The disconnect switch unit is preferably arranged in the battery housing. In this case, the at least one battery module is electrically connected to the at least one electrical component via the disconnect switch unit.

The battery housing preferably has a second temperature control device. In this case, the second temperature control device can have a second temperature control channel for transmitting a temperature control medium, which can be designed in the material of the battery housing. In this case, the second temperature control device can also be designed as a Peltier element unit. A Peltier element unit, which is also referred to as a thermoelectric cooler, comprises a plurality of Peltier elements and can be used both for cooling and for heating. The second temperature control device which is designed as a Peltier element unit can be arranged on the base of the battery housing between the base and the at least one battery module.

The first temperature control channel can be serially connected in a hydraulic manner to the second temperature control channel, in order to form a common temperature control circuit.

The at least one electrical component is preferably designed as a DC-DC converter. In this case, a negative path of an output of the DC-DC converter is connected to the second potential. This means that the negative path of the output of the DC-DC converter is electrically connected to the component housing.

Furthermore, a motor vehicle is proposed which comprises at least one battery system according to the invention.

The first ground potential, to which the battery housing is connected, is preferably a floating potential.

The second ground potential, to which the component housing is connected, is preferably equal to a potential of a body of the motor vehicle.

A common ground potential is usually selected for a battery system which has a plurality of electrical components. In order to improve electromagnetic compatibility, the battery housing and the control unit are electrically connected to the negative terminal of the at least one battery module. The negative terminal is then connected to the common ground potential via a line. Further electrical components which are powered by the at least one battery module as well as a housing or housings for the further electrical components are also connected to the common ground potential.

Owing to an impedance of the line between the negative terminal of the at least one battery module and the electrical ground potential, the potential of the negative terminal deviates from the common ground potential. However, the further electrical components which are powered by the at least one battery module are designed for the common ground potential.

This results in the further electrical components which are powered by the at least one battery module not being able to be integrated in the battery housing if the battery housing is connected to the negative terminal of the at least one battery module. If the further electrical components are arranged in a different housing or if they each have their own housing, there can be no electrically conductive connection between the battery housing and this other housing or these other housings. The disadvantage of this is that the battery system cannot be constructed in a compact manner in this case.

The battery system according to the invention which has a battery housing for the at least one battery module and the control unit as well as a component housing for the further electrical components, wherein the battery housing and the component housing are insulated from one another, makes it possible to assemble the battery housing and the component housing in a compact manner and to connect them to different ground potentials.

The battery system according to the invention thus significantly reduces the requirement for installation space.

Furthermore, the effort required for electrical connections between the at least one battery module and the further electrical components is reduced. Consequently, this reduces manufacturing costs.

The battery system according to the invention makes it possible to use a common temperature control circuit for the battery housing and the component housing. This results in a further reduction in manufacturing costs.

BRIEF DESCRIPTION OF THE DRAWINGS

Embodiments of the invention are explained in greater detail using the drawings and the following description.

In the drawings:

FIG. 1 shows a schematic sectional representation of a battery system according to the invention.

DETAILED DESCRIPTION

FIG. 1 represents the subject matter of the invention merely schematically.

FIG. 1 shows a schematic sectional representation of a battery system 100 according to the invention. In this case, the battery system 100 comprises a battery housing 200 made from cast aluminum which has a battery housing lower part 210 and a battery housing upper part 220 which is fitted on the battery housing lower part 210.

The battery system 100 further comprises a component housing 300 made from cast aluminum which has a component housing lower part 310 and a component housing upper part 320.

Furthermore, the battery system 100 comprises a battery module 10, a control unit 20 for controlling and monitoring the battery module 10 and a disconnect switch unit 30 for disconnecting a discharging current or a charging current of the battery module 10.

The battery module 10 is arranged on a base 212 of the battery housing lower part 210 and in this case comprises a plurality of prismatic battery cells 12 arranged alongside one another which each have a positive terminal 13 and a negative terminal 14. FIG. 1 represents twelve battery cells 12, namely a first battery cell 121 to a twelfth battery cell 1212 when viewed from the left. More or less than twelve battery cells 12 can of course be arranged in the battery module 10. In this case, the battery cells 12 are electrically serially connected to one another by means of a plurality of cell connectors 15. In this case, the positive terminal 13 of the first battery cell 121 represents a positive terminal of the battery module 10 and the negative terminal 14 of the twelfth battery cell 1212 represents a negative terminal of the battery module 10.

However, it is also conceivable for the battery cells 12 to be connected in parallel to one another.

The control unit 20 is arranged on the battery module 10. In this case, the control unit 20 is electrically connected to the battery module 10 or the individual battery cells 12 for controlling and monitoring via a plurality of conductors 18.

The disconnect switch unit 30 for disconnecting a discharging current or a charging current of the battery module 10 is arranged above the control unit 20.

In this case, the disconnect switch unit 30 has a first connection 31 and a second connection (not represented). The first connection 31 is in this case electrically connected to the positive terminal 13 of the first battery cell 121, which represents the positive terminal of the battery module 10, by means of a connector 50.

The component housing 300 is arranged on the battery housing upper part 220 of the battery system 100 according to the invention, in which component housing an electrical component 80, which can be designed as a DC-DC converter, is arranged. In this case, the component housing 300 has a component housing lower part 310 and a component housing upper part 320 which is fitted on the component housing lower part 310.

In this case, the battery housing upper part 220 and the component housing lower part 310 are each equipped with a feedthrough (not represented) for current and signal transmission. The disconnect switch unit 30 is electrically connected to the electrical component 80 by way of the feedthroughs.

In this case, the battery housing upper part 220 is coated with an insulator 40. The insulator 40 can be cathodic dip coating, for example. It is also conceivable to use hard adonizing or insulating adhesive tape. In this case, the insulator 40 can be coated exclusively on a surface of the battery housing upper part 220 which faces the component housing lower part 310. It is also conceivable for the battery housing upper part 220 to be completely coated with the insulator 40.

The component housing lower part 310 is in this case also coated with the insulator 40. In this case, the insulator 40 can be coated exclusively on a surface of the component housing lower part 310 which faces the battery housing upper part 220. It is also conceivable for the component housing lower part 310 to be completely coated with the insulator 40.

The battery housing lower part 210 and/or the component housing upper part 320 can advantageously also be coated with the insulator 40.

The battery housing upper part 220, the component housing lower part 310 and the component housing upper part 320 are screwed together. In this case, the battery housing upper part 220 has a plurality of first fixing holes 222. The component housing lower part 310 has a plurality of second fixing holes 312 and the component housing upper part 320 has a plurality of third fixing holes 322. In this case, the second and third fixing holes 312, 322 are each designed as a through hole. Electrically non-conductive screws 90, such as plastic screws, for example, are used for fixing together the battery housing upper part 220, the component housing lower part 310 and the component housing upper part 320.

A sealing cord 330 is placed between the component housing lower part 310 and the battery housing upper part 220. A first temperature control channel 403 in a first temperature control device 402 for transmitting a temperature control medium is designed in a region enclosed by the sealing cord 330 between the component housing lower part 310 and the battery housing upper part 220. In this case, the first temperature control channel 403 is insulated from the battery housing upper part 220 and the component housing lower part 310. The first temperature control device 402 can also be designed as a Peltier element unit 401.

The battery housing 200 can have a second temperature control device. In this case, the second temperature control device can have a second temperature control channel for transmitting the temperature control medium, which can be designed in the material of the battery housing lower part 210 and/or the battery housing upper part 220. The second temperature control device can also be designed as a Peltier element unit 401. The second temperature control device which is designed as a Peltier element unit can be arranged on the base 212 of the battery housing lower part 210 and between the base 212 and the battery module 10.

In this case, the first temperature control channel 403 can be serially connected in a hydraulic manner to the second temperature control channel, in order to form a common temperature control circuit.

A potential of the negative terminal of the battery module 10, which is represented by the negative terminal 14 of the twelfth battery cell 1212, is selected as ground potential for the control unit 20.

The potential of the negative terminal of the battery module 10 can also be selected for the first ground potential of the battery housing 200. However, it is also conceivable for the first ground potential to be a floating potential.

A different potential is selected for the second ground potential of the component housing 300, which potential is different from the first ground potential. The second ground potential is selected for the electrical component 80 which is arranged in the component housing 300.

If the battery system 100 according to the invention is used in a motor vehicle, the component housing 300 can be electrically connected to a body of the motor vehicle and the second ground potential is thus equal to a potential of the body. In this case, the battery housing 200 can be electrically connected to the negative terminal of the battery module 10 and the first ground potential is thus equal to the potential of the negative terminal. In this case, the battery housing 200 can also be connected to a floating potential. This means that the battery housing 200 is electrically insulated from all other electrically conductive parts of the motor vehicle.

The invention is not limited to the exemplary embodiments described herein and the aspects highlighted therein. In fact, within the range specified by the claims, a plurality of variations are possible which are within the scope of action of the person skilled in the art.

What is claimed is:

1. A battery system (100), comprising
a metallic battery housing (200), and
a metallic component housing (300),
wherein at least one battery module (10) having at least one battery cell (12) and a control unit (20) for controlling and monitoring the at least one battery module (10) are arranged in the battery housing (200),
wherein at least one electrical component (80) is arranged in the component housing (300) and is electrically connected to the at least one battery module (10),
wherein the component housing (300) is arranged on the battery housing (200),
wherein the component housing (300) and the battery housing (200) are mechanically connected to one another and electrically insulated from one another,
wherein the battery housing (200) is connected to a first ground potential and the component housing (300) is connected to a second ground potential, wherein the first ground potential is different from the second ground potential, wherein a first temperature control device is formed between the battery housing (200) and the component housing (300), wherein the first temperature control device is insulated from the battery housing (200) and the component housing (300), wherein the first temperature control device includes a seal (330) between a battery housing upper part (220) and a component housing lower part (310), and wherein an area enclosed by the seal (330) between the battery housing upper part (220) and the component housing lower part (310) forms a first temperature control channel.

2. The battery system (100) according to claim 1, characterized in that the battery housing (200) and the component housing (300) are connected to one another in a cohesive or form-fitting manner.

3. The battery system (100) according to claim 1, characterized in that the battery housing (200) and/or the component housing (300) are in each case coated with an insulator (40).

4. The battery system (100) according to claim 1, characterized in that a disconnect switch unit (30) for disconnecting a discharging current or a charging current of the at least one battery module (10) is arranged in the battery housing (200).

5. The battery system (100) according to claim 1, characterized in that the battery housing (200) has a second temperature control device.

6. The battery system (100) according to claim 1, characterized in that the at least one electrical component (80) is a DC-DC converter.

7. The battery system (100) according to claim 2, characterized in that the battery housing (200) and/or the component housing (300) are in each case coated with an insulator (40).

8. The battery system (100) according to claim 7, characterized in that a disconnect switch unit (30) for disconnecting a discharging current or a charging current of the at least one battery module (10) is arranged in the battery housing (200).

9. The battery system (100) according to claim 8, characterized in that the battery housing (200) has a second temperature control device.

10. The battery system (100) according to claim 9, characterized in that the at least one electrical component (80) is a DC-DC converter.

11. A motor vehicle comprising at least one battery system (100) according to claim 1.

12. The motor vehicle according to claim 11, characterized in that the first ground potential is a floating potential.

13. The motor vehicle according to claim 12, characterized in that the second ground potential is equal to a potential of a body of the motor vehicle.

14. The motor vehicle according to claim 11, characterized in that the second ground potential is equal to a potential of a body of the motor vehicle.

\* \* \* \* \*